US011163463B2

(12) United States Patent
Tylik et al.

(10) Patent No.: US 11,163,463 B2
(45) Date of Patent: Nov. 2, 2021

(54) NON-DISRUPTIVE MIGRATION OF A VIRTUAL VOLUME IN A CLUSTERED DATA STORAGE SYSTEM

(71) Applicant: EMC IP Holding Company LLC, Hopkinton, MA (US)

(72) Inventors: Dmitry Tylik, Westborough, MA (US); Vinod Rajasekaran, Morrisville, NC (US); Anil K. Koluguri, Raleigh, NC (US); Matthew H. Long, Uxbridge, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/939,229

(22) Filed: Jul. 27, 2020

(65) Prior Publication Data
US 2020/0356287 A1  Nov. 12, 2020

Related U.S. Application Data

(63) Continuation of application No. 16/176,782, filed on Oct. 31, 2018, now Pat. No. 10,768,837.

(51) Int. Cl.
*G06F 9/455* (2018.01)
*G06F 3/06* (2006.01)
*G06F 13/14* (2006.01)

(52) U.S. Cl.
CPC .......... *G06F 3/0631* (2013.01); *G06F 3/0604* (2013.01); *G06F 3/0647* (2013.01); *G06F 3/0679* (2013.01); *G06F 13/14* (2013.01); *G06F 2009/45579* (2013.01)

(58) Field of Classification Search
CPC ...... G06F 3/0631; G06F 13/14; G06F 3/0647; G06F 3/0679; G06F 3/0604; G06F 2009/45579; G06F 3/067; G06F 3/061
See application file for complete search history.

*Primary Examiner* — Christopher D Birkhimer
(74) *Attorney, Agent, or Firm* — BainwoodHuang

(57) ABSTRACT

A virtual volume is initially provided from a first storage appliance within a cluster of storage appliances by providing access to the virtual volume over a data path between a host computer and a protocol endpoint hosted on the first storage appliance, based on an initial binding between the virtual volume and the protocol endpoint hosted on the first storage appliance. A rebind request is conveyed to the host computer, and in response to receiving a bind request for the virtual volume, a new binding is created between the virtual volume and a protocol endpoint hosted by the second storage appliance. The virtual volume is subsequently provided from the second storage appliance by providing the host computer with access to the virtual volume over a data path between the host computer and the protocol endpoint hosted on the second storage appliance based on the newly created binding.

20 Claims, 8 Drawing Sheets

NON-DISRUPTIVE MIGRATION OF A VIRTUAL VOLUME IN A CLUSTERED DATA STORAGE SYSTEM

RELATED APPLICATIONS

This application is a Continuation of U.S. patent application Ser. No. 16/176,782, filed on Oct. 31, 2018 at the United States Patent and Trademark Office, entitled "NON-DISRUPTIVE MIGRATION OF A VIRTUAL VOLUME IN A CLUSTERED DATA STORAGE SYSTEM", the entire contents of which is hereby incorporated herein by reference.

TECHNICAL FIELD

The present disclosure relates generally to techniques for providing virtual volumes of non-volatile data storage to host computer systems, and more specifically to technology for providing non-disruptive migration of a virtual volume in a clustered data storage system.

BACKGROUND

As it is generally known, virtual machines are computer software emulations of hardware computer systems. Virtual machines are typically created by and run on a hypervisor or virtual machine monitor that may also be referred to as a virtualization platform or virtualization environment. Virtual volumes have been used to integrate physical, non-volatile data storage into the virtualization environment. Some data storage systems (e.g. storage arrays) have exposed virtual volumes as data storage objects to the virtualization environment, making it convenient for the virtual volumes to then be consumed as virtual disks by virtual machines running in the virtualization environment.

Under various types of circumstances, it may be desirable to change the location of a virtual volume from a first data storage system to a second data storage system. Examples of such circumstances include without limitation resource imbalances that may arise between different data storage systems, such as an inadequate amount of resources (e.g. storage, processing, and/or network resources) being available to support the virtual volume on a first data storage system, and a sufficient amount of available resources being available to support the virtual volume on a second data storage system.

SUMMARY

Previous technologies for providing virtual volumes within clusters of data storage systems have exhibited significant shortcomings. For example, some previous configurations of data storage systems have not allowed the migration of virtual volumes between different data storage systems located within a cluster. As a result, under circumstances where inadequate resources are available to continue providing a virtual volume on one data storage system in a cluster, e.g. because the virtual volume has grown in size or is predicted to grow in size and physical data storage resources on that data storage system are or are predicted to become inadequate to support the virtual volume, a system administrator may be forced to add more resources to the data storage system, e.g. physical data storage resources (e.g. another disk drive), even though another data storage system located within the same cluster may have sufficient available resources (e.g. physical data storage resources) to support the virtual volume at its current or predicted increased size.

In another example of shortcomings in previous technologies, some clusters of data storage systems have only exposed a single protocol endpoint to the host for the entire cluster. As a result, a host I/O operation directed to a specific virtual volume provided by the cluster must initially be directed to the single protocol endpoint exposed by the cluster, and then redirected within the cluster from the receiving data storage system hosting the single exposed protocol endpoint to another data storage system within the cluster that actually contains the virtual volume, before the I/O operation can be performed on the virtual volume. The additional time required to route received host I/O operations within clusters that expose only a single protocol endpoint for the entire cluster may result in higher latency in servicing I/O operations.

To address the above described and/or other shortcomings of previous technologies, new technology is disclosed herein for migrating a virtual volume between different storage appliances within a cluster of storage appliances. In the disclosed technology, a virtual volume is initially provided to at least one host computer from a first storage appliance within a cluster of storage appliances. While in some embodiments the host computer may be located outside the cluster of storage appliances, the host computer may alternatively be located together with the storage appliances in the cluster. Initially providing the virtual volume to the host computer from the first storage appliance includes providing the host computer with access to the virtual volume over a data path between the host computer and a protocol endpoint hosted on the first storage appliance in response to an initial binding between the virtual volume and the protocol endpoint hosted on the first storage appliance. The virtual volume is migrated from the first storage appliance within the cluster to a second storage appliance within the cluster at least in part by conveying a rebind request to the host computer, the rebind request indicating to the host computer that the host computer should issue a bind request for the virtual volume. Migrating the virtual volume from the first storage appliance to the second storage appliance further includes creating, in response to receipt of a bind request for the virtual volume from the host computer, a new binding between the virtual volume and a protocol endpoint hosted by the second storage appliance, and may further include providing, in response to creation of the new binding between the virtual volume and the protocol endpoint hosted on the second storage appliance, the virtual volume to the host computer from the second storage appliance. Providing the virtual volume to the host computer from the second storage appliance may further include providing the host computer with access to the virtual volume over a data path between the host computer and the protocol endpoint hosted on the second storage appliance in response to the new binding between the virtual volume and the protocol endpoint hosted on the second storage appliance.

In some embodiments, the first storage appliance may include a first set of non-volatile data storage devices and the second storage appliance may include a second set of non-volatile data storage devices. In such embodiments, initially providing the virtual volume to the host from the first storage appliance may further include allocating portions of the non-volatile data storage devices in the first storage appliance to the virtual volume to store host data written to the virtual volume while the virtual volume is provided to the host computer from the first storage appliance, and migrating the virtual volume from the first storage appliance to the second storage appliance may include copying, over a communication path between the first storage appliance and the second storage appliance that is different from the data path between the host computer and the protocol endpoint hosted on the first storage appliance and the data path between the host computer and the protocol endpoint hosted on the second storage appliance, the host data stored in the portions of the non-volatile data storage devices in the first storage appliance allocated to the virtual volume to portions of the non-volatile data storage devices in the second storage appliance.

In some embodiments, the host data stored in the portions of the non-volatile data storage devices in the first storage appliance allocated to the virtual volume may be completely copied to portions of the non-volatile data storage devices in the second storage appliance prior to providing the virtual volume to the host computer from the second storage appliance.

In some embodiments, the host data stored in the portions of the non-volatile data storage devices in the first storage appliance allocated to the virtual volume may be completely copied to portions of the non-volatile data storage devices in the second storage appliance prior to conveying the rebind request to the host computer.

In some embodiments, the host data stored in the portions of the non-volatile data storage devices in the first storage appliance allocated to the virtual volume may be copied to portions of the non-volatile data storage devices in the second storage appliance at least in part while providing the virtual volume to the host computer from the second storage appliance.

In some embodiments, the host data stored in the portions of the non-volatile data storage devices in the first storage appliance allocated to the virtual volume may be copied to portions of the non-volatile data storage devices in the second storage appliance at least in part after conveying the rebind request to the host computer.

In some embodiments, a communication may be made to the host computer indicating that the virtual volume is reachable through the protocol endpoint hosted on the first appliance in response to creation of the initial binding between the virtual volume and the protocol endpoint hosted on the first storage appliance when the virtual volume is initially created.

In some embodiments, a communication may be made to the host computer indicating that the virtual volume is reachable through the protocol endpoint hosted on the second appliance in response to creation of the new binding between the virtual volume and the protocol endpoint hosted on the second appliance.

In some embodiments, a single management interface to the cluster of storage appliances may be provided to the host computer that exposes the cluster of storage appliances to the host computer as a single storage array. Each storage appliance in the cluster may host one or more protocol endpoints, and the protocol endpoints hosted on the storage appliances in the cluster may be visible to the host computer through the single management interface to the cluster of storage appliances provided to the host computer.

In some embodiments, the host data stored in the portions of the non-volatile data storage devices in the first storage appliance allocated to the virtual volume may be completely copied to portions of the non-volatile data storage devices in the second storage appliance at least in part by conveying at least one snapshot of the virtual volume from the first storage appliance to the second storage appliance.

In some embodiments, host I/O operations directed to the virtual volume and received by the first storage appliance over the data path between the host computer and the protocol endpoint hosted on the first storage appliance may be mirrored to the second storage appliance prior to providing the virtual volume to the host computer from the second storage appliance.

In some embodiments, mirroring host I/O operations directed to the virtual volume and received by the first storage appliance over the data path between the host computer and the protocol endpoint hosted on the first storage appliance to the second storage appliance may continue until a path probe message is received from the host computer through the data path between the host computer and the protocol endpoint hosted on the second storage appliance.

The disclosed system may be embodied to provide significant advantages over previous technologies. For example, because the disclosed technology enables migration of a virtual volume between different storage devices in a cluster of storage appliances, a storage volume can be moved from a storage appliance that initially contains the storage volume to another storage appliance in the same cluster for purposes of load balancing, for example when inadequate resources are available to continue providing the virtual volume on the data storage system initially containing the virtual volume, and sufficient resources are available to provide the virtual volume from the other storage appliance. In another example of an advantage over previous technologies, the copying of virtual volume data stored in non-volatile storage of the initial storage appliance to the other storage appliance over a communication path is separate and independent from the data paths between the host computer and the storage appliances may avoid a negative impact on the availability and/or performance of the data paths between the host computer and the storage appliances during the migration. In another example of an advantage over previous technologies, because all the storage appliances of the cluster have protocol endpoints that are exposed to the host computer and are operable to form data paths from the host computer directly to the storage appliances in the cluster, there is no need for time consuming routing of received I/O operations from a data storage appliance exposing a single protocol endpoint for the cluster to other storage appliances within the cluster containing the virtual volumes to which the I/O operations are directed. As a result, lower latency may be provided for servicing I/O operations on virtual volumes contained in the data storage systems within the cluster using the disclosed technology.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Figure 1:
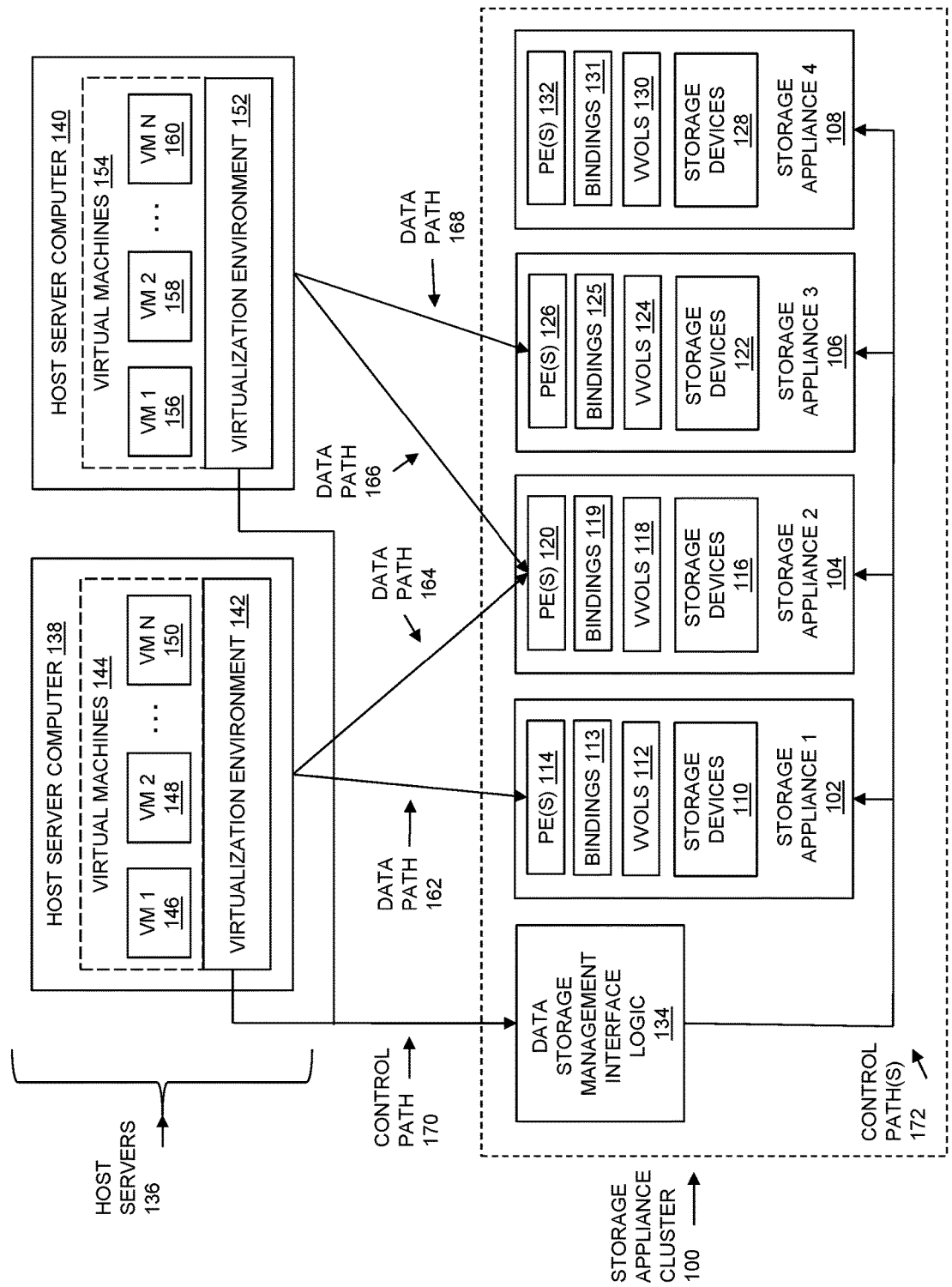
FIG. 1 is a block diagram showing an example of components in an operational environment including an illustrative embodiment of the disclosed technology.

Embodiments will now be described with reference to the figures. Such embodiments are provided only by way of example and for purposes of illustration. The scope of the claims is not limited to the examples of specific embodiments shown in the figures and/or otherwise described herein.

The individual features of the particular embodiments, examples, and implementations described herein can be combined in any manner that makes technological sense. Such features are hereby combined to form all possible combinations, permutations and/or variations except to the extent that such combinations, permutations and/or variations have been expressly excluded herein and/or are technically impractical. The description in this document is intended to provide support for all such combinations, permutations and/or variations.

As described herein, a virtual volume is initially provided to at least one host computer from a first storage appliance within a cluster of storage appliances. Initially providing the virtual volume to the host computer from the first storage appliance may include providing the host computer with access to the virtual volume over a data path between the host computer and a protocol endpoint hosted on the first storage appliance in response to an initial binding between the virtual volume and the protocol endpoint hosted on the first storage appliance. In some embodiments the host computer may be located outside the cluster of storage appliances, but alternatively the host computer may be located together with the storage appliances in the cluster. The virtual volume is migrated from the first storage appliance within the cluster to a second storage appliance within the cluster. During migration, a rebind request is conveyed to the host computer. The rebind request may be issued by or through a single management interface provided by the cluster, and indicates to the host computer that the host computer should issue a bind request for the virtual volume, e.g. to the cluster management interface. Migrating the virtual volume from the first storage appliance to the second storage appliance further includes responding to receipt of a bind request for the virtual volume from the host computer creating, e.g. by the cluster management interface, by creating a new binding between the virtual volume and a protocol endpoint hosted by the second storage appliance. Migrating the virtual volume may further include providing, in response to creation of the new binding between the virtual volume and the protocol endpoint hosted on the second storage appliance, the virtual volume to the host computer from the second storage appliance. Providing the virtual volume to the host computer from the second storage appliance includes providing the host computer with access to the virtual volume over a data path between the host computer and the protocol endpoint hosted on the second storage appliance in response to the new binding between the virtual volume and the protocol endpoint hosted on the second storage appliance.

FIG. 1 is a block diagram showing an example of components in an operational environment including an embodiment of the disclosed technology. As shown in FIG. 1, a Storage Appliance Cluster 100 includes multiple storage appliances, shown for purposes of illustration by Storage Appliance 1 102, Storage Appliance 2 104, Storage Appliance 3 106, and Storage Appliance 4 108. While in the example of FIG. 1 Storage Appliance Cluster 100 includes four storage appliances, the technology disclosed herein is not limited to storage appliance clusters made up of that specific number of storage appliances, and may be embodied in storage appliance clusters that include other specific numbers of storage appliances.

Each one of the storage appliances in the Storage Appliance Cluster 100 contains and/or is communicably coupled to one or more non-volatile data storage devices, such as one or more magnetic disk drives, one or more electronic flash drives, and/or one or more optical drives. In the example of FIG. 1, Storage Appliance 1 102 is shown including Storage Devices 110, Storage Appliance 2 104 is shown including Storage Devices 116, Storage Appliance 106 is shown including Storage Devices 122, and Storage Appliance 108 is shown including Storage Devices 128.

The storage appliances in Storage Appliance Cluster 100 (i.e. Storage Appliance 1 102, Storage Appliance 2 104, Storage Appliance 3 106, and Storage Appliance 4 108) provide storage services that are consumed by a virtualization environment and/or virtual machines executing in Host Servers 136. In the example of FIG. 1, Host Servers 136 are shown including at least Host Server Computer 138 and Host Server Computer 140. Each virtual machine executing in one of the host server computers executes in a virtualization environment provided in the Host Servers 136. For example, the Virtual Machines 144 (VM 1 146, VM 2 148, and so on through VM N 150) executing in Host Server Computer 138 execute in Virtualization Environment 142, and the Virtual Machines 154 (VM 1 156, VM 2 158 and so on through VM N 160) executing in Host Server Computer 140 execute in Virtualization Environment 152. Virtualization Environment 142 and Virtualization Environment 152 may each consist of or include one or more hypervisors or virtual machine monitors. Each one of the virtual machines executing in the Host Servers 136 may consist of or include a computer software emulation of a hardware computer system, and may execute one or more programs as if they were executing on actual hardware, such as a complete operating system, one or more application programs, and/or other specific types of programs.

While in the example of FIG. 1, Host Servers 136 are shown external to the Storage Appliance Cluster 100, the techniques described herein are not limited to such embodiments. Alternatively, Host Servers 136 may be located in whole or in part together with the storage appliances in Storage Appliance Cluster 100, as in the case of a hyper-converged storage array that hosts both storage and compute resources.

Virtual volumes (VVols) are provided to the Host Servers 136 by the storage appliances in Storage Appliance Cluster 100 in order to integrate physical, non-volatile data storage from storage devices of the storage appliances into the Virtualization Environment 142 and the Virtualization Environment 152. Each one of the storage appliances exposes a unique set of virtual volumes to the Host Servers 136. Each one of the virtual volumes in the storage appliances in Storage Appliance Cluster 100 may be consumed by one or more of the virtual machines running on the Host Servers 136. In the example of FIG. 1, Storage Appliance 1 102 contains VVols 112, Storage Appliance 2 104 contains VVols 118, Storage Appliance 3 106 contains VVols 124, and Storage Appliance 4 108 contains VVols 130.

Each virtual volume provided by a storage appliance is allocated some number of units of storage space from the storage devices in that storage appliance. The units of storage space allocated to a given virtual volume may be mapped to respective portions of the virtual volume, and may be used to store host data directed to the virtual volume in host I/O operations (e.g. reads, writes) received from the Host Servers 136. A "slice" is one example of the units of storage space (e.g. 256 megabytes or 1 gigabytes in size) that may be allocated from a storage device to a virtual volume.

In some embodiments, the storage services provided by the storage appliances in Storage Appliance Cluster 100 may include one or more block-based storage services that provide blocks of non-volatile storage from virtual volumes. Such block-based storage services may, for example, employ the Small Computer System Interface (SCSI), Internet Small Computer System Interface (iSCSI) protocol, and/or Fibre Channel (FC) network technology to communicate between the Host Servers 136 and the storage appliances in the Storage Appliance Cluster 100. In some embodiments, the storage services provided by the storage appliances in Storage Appliance Cluster 100 may also or alternatively include one or more file-based storage services that provide storage of files for virtual machines. Such file-based storage services may, for example, be based in whole or in part on the Network File System (NFS) protocol, the Server Message Block (SMB) or Common Internet File System (CIFS) application-layer network protocol, the Apple Filing Protocol (AFP), or other appropriate protocols.

To support the delivery of host I/O operations (e.g. read or write I/O operations) sent from the Host Servers 136 on behalf of virtual machines running therein to the virtual volumes provided by the storage appliances in Storage Appliance Cluster 100, each virtual volume is bound to at least one protocol endpoint module hosted within the same storage appliance that contains the virtual volume. Each storage appliance in Storage Appliance Cluster 100 hosts its own unique set of one or more protocol endpoints (PEs), as illustrated in FIG. 1 by PE(s) 114 hosted in Storage Appliance 1 102, PE(s) 120 hosted in Storage Appliance 2 104, PE(s) 126 hosted in Storage Appliance 3 106, and PE(s) 132 hosted in Storage Appliance 4 108. Each one of the virtual volumes in VVols 112 is bound to at least one of the protocol endpoints in PE(s) 114, each one of the virtual volumes in VVols 118 is bound to at least one of the protocol endpoints in PE(s) 120, each one of the virtual volumes in VVols 124 is bound to at least one of the protocol endpoints in PE(s) 126, and each one of the virtual volumes in VVols 130 is bound to at least one of the protocol endpoints in PE(s) 132.

The specific bindings between the virtual volumes and protocol endpoints of each storage appliance in Storage Appliance Cluster 100 may be stored in the Host Servers 136, in the Data Storage Management Interface Logic 134, and/or in the storage appliances. For purposes of illustration in FIG. 1, the bindings between the VVols 112 and PE(s) 114 in Storage Appliance 1 102 are shown by Bindings 113, the bindings between the VVols 118 and PE(s) 120 in Storage Appliance 2 104 are shown by Bindings 119, the bindings between the VVols 124 and PE(s) 126 in Storage Appliance 3 106 are shown by Bindings 125, and the bindings between the VVols 130 and PE(s) 132 in Storage Appliance 4 108 are shown by Bindings 131. Copies of Bindings 113, Bindings 119, Bindings 125, and Bindings 131 may be stored within the Host Servers 136 and/or the Data Storage Management Interface Logic 134.

Each protocol endpoint that is bound to a virtual volume operates as a logical I/O proxy for that virtual volume. For a given virtual volume, the data path used by the Host Servers 136 to access the virtual volume is to the protocol endpoint to which the virtual volume is bound. The data path for a virtual volume may be responsive to exposure of a binding between the virtual volume and a protocol endpoint to the Host Servers 136 by the Storage Appliance Cluster 100, e.g. through Storage Appliance Management Interface Logic 134. The data path for a virtual volume may span one or more communication networks, such as the Internet, a local area network (LAN), and/or a storage area network (SAN). When a host server computer on which a virtual machine is executing sends a host I/O operation directed to a virtual volume on behalf of the virtual machine, it sends the host I/O operation over a data path between the host server computer and a protocol endpoint to which that virtual volume is bound. Examples of data paths are shown in FIG. 1 by Data Path 162 between Host Server Computer 138 and a protocol endpoint in PE(s) 114, Data Path 164 and a protocol endpoint in PE(s) 120, Data Path 166 between Host Server Computer 140 and a protocol endpoint in PE(s) 120, and Data Path 168 between Host Server Computer 140 and a protocol endpoint in PE(s) 126.

Each protocol endpoint may have a unique identifier, such as a logical unit number (LUN), World Wide Name (WWN), Internet Protocol (IP) address, or some other type of identifier or address, that can be used by the host server computer to direct host I/O operations to a virtual volume bound to the protocol endpoint, by sending the host I/O operations using the unique identifier of the protocol endpoint as a destination identifier or address. The receiving protocol endpoint passes the host I/O operation to the virtual volume to which the host I/O operation is directed within the data storage system that hosts the protocol endpoint.

In some embodiments, a single management interface may be provided to the Storage Appliance Cluster 100, shown for purposes of illustration in FIG. 1 by Data Storage Management Interface Logic 134. Data Storage Management Interface Logic 134 may expose the protocol endpoints, virtual volumes, and the bindings between protocol endpoints and virtual volumes in all of the storage appliances in Storage Appliance Cluster 100, to the Host Servers 136, as if the protocol endpoints and virtual volumes in all the storage appliances in Storage Application Cluster 100 were all present in a single storage array of non-volatile data storage devices. Accordingly, Data Storage Management Interface Logic 134 may indicate the presence and availability within Storage Appliance Cluster 100 of the protocol endpoints PE(s) 114, PE(s) 120, PE(s) 126, and PE(s) 132, and virtual volumes VVols 112, VVols 118, VVols 124, and VVols 130, and may also provide indications of Bindings 113, Bindings 119, Bindings 125, and Bindings 131, to Host Servers 136, without indicating to Host Servers 136 the specific storage appliances on which individual protocol endpoints and/or virtual volumes are hosted.

Data Storage Management Logic 134 may consist of or include program logic that executes on one or more of the storage appliances in Storage Appliance Cluster 100, and/or that is stored in the memory of, and executes on the processing circuitry of, one or more separate computers or computing devices that are also contained within or are communicably coupled to the Storage Appliance Cluster 100.

Data Storage Management Interface Logic 134 communicates with the Host Servers 136 through a control path, e.g. Control Path 170 in FIG. 1. Control Path 170 consists of or includes one or more communication paths (e.g. network connections, etc.) that are logically and/or physically separate from the data paths over which host I/O operations are conveyed between the Host Servers 136 and the storage appliances in Storage Appliance Cluster 100.

Data Storage Management Interface Logic 134 communicates with each of the storage appliances in Storage Appliance Cluster 100 over one or more control paths, e.g. Control Path(s) 172 in FIG. 1. Control Path(s) 172 also consist of or include one or more communication paths (e.g. network connections, etc.) that are also logically and/or physically separate from the data paths over which I/O operations are conveyed between the Host Servers 136 and the storage appliances in Storage Appliance Cluster 100.

Figure 2:
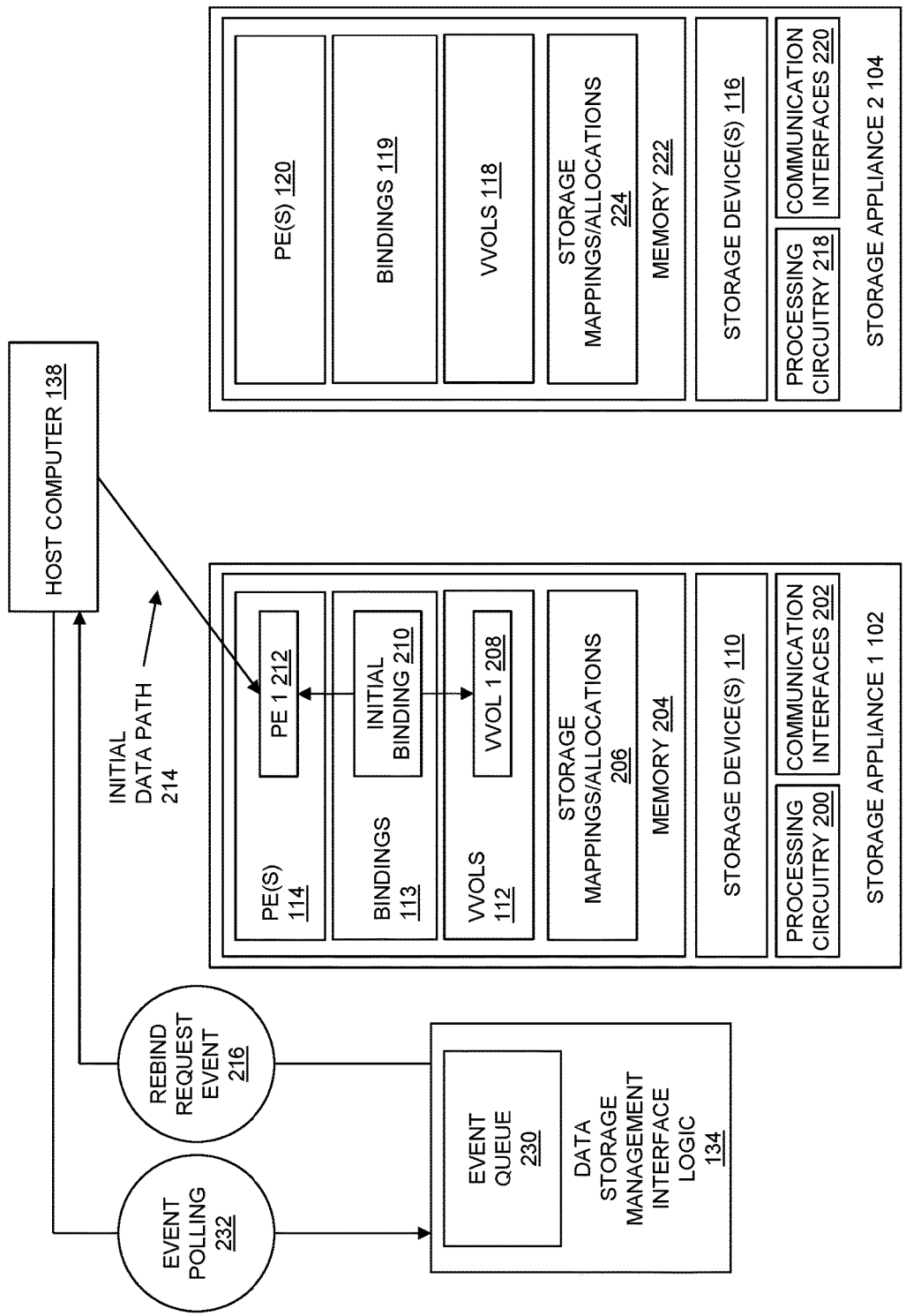
FIG. 2 is a block diagram showing an example of components in two storage appliances in some embodiments, and an initial data path used by a host computer to access a virtual volume based on an initial binding of a virtual volume to a protocol endpoint.

FIG. 2 shows an example of the disclosed technology that illustrates further components in some embodiment of Storage Appliance 1 102, Storage Appliance 2 104, and Data Storage Management Interface Logic 134. As shown in FIG. 2, Storage Appliance 1 102 may include a Memory 204, and Storage Appliance 2 may include a Memory 222. Memory 204 and Memory 222 may each include or consist of volatile memory (e.g., RAM), and/or non-volatile memory, such as one or more ROMs, disk drives, solid state drives, and the like. As also shown in FIG. 2, Storage Appliance 1 102 may further include Processing Circuitry 200, and Storage Appliance 2 104 may include Processing Circuitry 218. Processing Circuitry 200 and Processing Circuitry 218 may each include or consist of one or more central processing units (CPUs) and associated electronic circuitry. As further shown in FIG. 2, Storage Appliance 1 102 may include Communication Interfaces 202, and Storage Appliance 2 104 may include Communication Interfaces 220. Communication Interfaces 202 and Communications 220 may each include or consist of SCSI target adapters and/or network interface adapters or the like for converting electronic and/or optical signals received over a network into electronic form for use by the respective storage appliance.

Memory 204 stores program code that is executable by the Processing Circuitry 200 to cause Processing Circuitry 200 to perform operations and functions of the technology described herein with regard to Storage Appliance 1 102. Examples of executable program code and/or data structures that may be stored in Memory 204 are shown for purposes of illustration in FIG. 2 as including PE(s) 114, Bindings 113, VVols 112, and additionally Storage Mappings/Allocations 206. Storage Mappings/Allocations 206 store indications of units of non-volatile storage that are allocated from Storage Device(s) 110 to individual virtual volumes in VVols 112, and/or the mappings of such units of non-volatile storage to respective portions of the virtual volumes to which they are allocated.

Memory 222 stores program code that is executable by the Processing Circuitry 218 to cause Processing Circuitry 218 to perform operations and functions of the technology described herein with regard to Storage Appliance 2 104. Examples of executable program code and/or data structures that may be stored in Memory 222 are shown for purposes of illustration in FIG. 2 as including PE(s) 120, Bindings 119, VVols 118, and additionally Storage Mappings/Allocations 224. Storage Mappings/Allocations 224 store indications of units of storage space that are allocated from Storage Device(s) 116 to individual virtual volumes in VVols 118, and/or the mappings of such units of storage space to respective portions the virtual volumes to which they are allocated.

Although certain program code and data structures are specifically shown in Memory 204 and Memory 222, Memory 204 and Memory 222 may additionally include various other software constructs, which are not shown, including without limitation an operating system, various applications, and/or other processes and/or data structures.

As shown in FIG. 2, VVols 112 in Storage Appliance 1 102 include a virtual volume VVol 1 208. VVol 1 208 is initially provided from Storage Appliance 1 102 to Host Computer 138, e.g. for use by one or more of the Virtual Machines 144 executing in Host Computer 138. VVol 1 208 is initially provided from Storage Appliance 1 102 to Host Computer 138 at least in part by providing Host Computer 138 with access to VVol 1 208 over a data path between Host Computer 138 and a protocol endpoint hosted on Storage Appliance 1 102, shown in FIG. 2 by Initial Data Path 214 between Host Computer 138 and PE 1 212. Access to VVol 1 208 by Host Computer 138 over Initial Data Path 214 is provided in response to an initial binding between VVol 1 208 and PE 1 212, shown for purposes of illustration in FIG. 2 by Initial Binding 210. While VVol 1 208 is provided to Host 138 by Storage Appliance 1 102, Host Computer 138 responds to the initial binding between VVol 1 208 and PE 1 212 by sending host I/O operations directed to VVol 1 208 to PE 1 212 over Initial Data Path 214.

In some embodiments, initially providing VVol 1 208 from Storage Appliance 1 102 to Host Computer 138 may further include allocating units of non-volatile data storage from Storage Device(s) 110 to VVol 1 208 to store host data written to VVol 1 208 by host write I/O operations received by Storage Appliance 1 102 from Host Computer 138 over Initial Data Path 214 while VVol 1 208 is being provided from Storage Appliance 1 102 to Host Computer 138.

In some embodiments, Host Computer 138 accesses VVol 1 208 over Initial Data Path 214 further in response to a communication sent to Host Computer 138 from Storage Appliance Cluster 100 when VVol 1 208 is originally created in Storage Appliance 1 102, indicating Initial Binding 210. For example, in response to detecting that VVol 1 208 has been created on Storage Appliance 1 102, and further in response to a determination that VVol 1 208 is to be initially accessed by Host Computer 138 through PE 1 212, upon receipt of an initial bind request from Host Computer 136 Data Storage Management Interface Logic 134 may send or otherwise provide an indication over Control Path 170 to Virtualization Environment 142 that VVol 1 208 is to be accessed by through Initial Data Path 214 between Host Computer 138 and PE 1 212. Such an indication provided from Data Storage Management Interface Logic 134 to Virtualization Environment 142 may cause Host Computer 138 to store a copy of Initial Binding 210, and then in response to Initial Binding 210 send host I/O operations that are directed to VVol 1 208 to PE 1 212 over Initial Data Path 214.

In some embodiments, when an event occurs causing VVol 1 208 to be migrated from Storage Appliance 1 102 to Storage Appliance 2 104, VVol 1 208 is migrated at least in part by conveying a rebind request to the host computer, shown in FIG. 2 by Rebind Request Event 216. For example, Data Storage Management Interface Logic 134 may include an event queue that is periodically polled by Virtualization Environment 142. The polling of Event Queue 230 is shown in FIG. 2 by Event Polling 232. At some point after Data Storage Management Interface Logic 134 determines that VVol 1 208 is to be migrated to Storage Appliance 2 104, Data Storage Management Interface Logic 134 may place the Rebind Request Event 216 onto Event Queue 230, and Virtualization Environment 142 subsequently reads Rebind Request Event 216 when it next polls Event Queue 230. The Rebind Request Event 216 indicates to the Host Computer 138 that the Host Computer 138 should issue a new bind request for the VVol 1 208 to the Storage Appliance Cluster 100.

In some embodiments, the polling of the Event Queue 230 by Host Computer 138 may be monitored by Data Storage Management Interface Logic 134. In the case where Data Storage Management Interface Logic 134 detects that Host Computer 138 has stopped polling Event Queue 230, virtual volume migration may be prevented.

Figure 3:
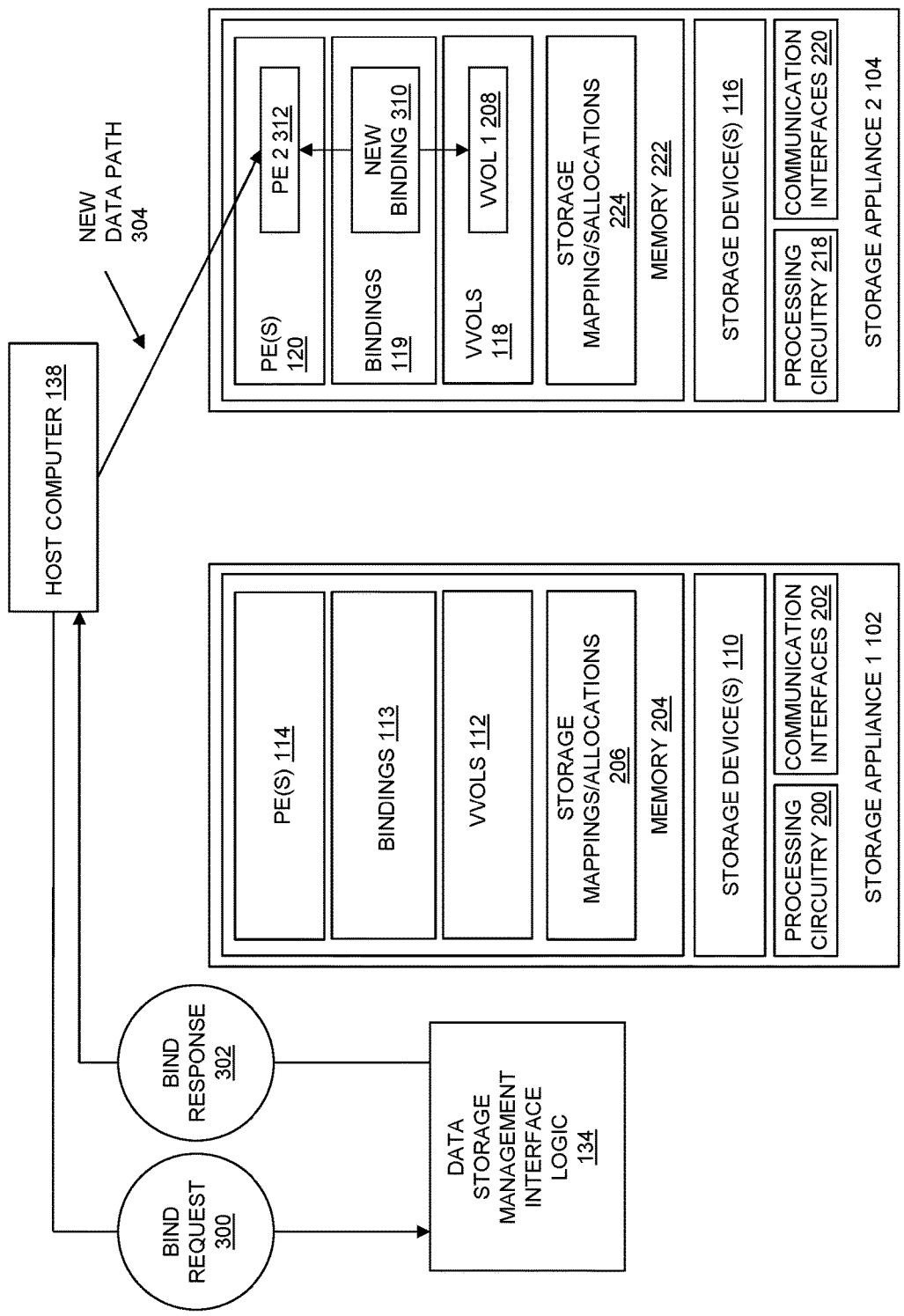
FIG. 3 is a block diagram showing the example of FIG. 2 after the virtual volume has been migrated, and a new data path is being used by the host computer to access the virtual volume based on a new binding of the virtual volume to another protocol endpoint.

As shown in FIG. 3, in response to receipt of the Rebind Request Event 216 shown in FIG. 2, Host Computer 138 sends the new Bind Request 300 for VVol 1 208 to Data Storage Management Interface Logic 134, requesting a new binding for VVol 1 208 to a protocol endpoint within Storage Appliance Cluster 100. In response to receipt of the Bind Request 200, Data Storage Management Interface Logic 134 may then indicate to Host Computer 138, e.g. in a Bind Response 302, that VVol 1 208 is subsequently to be accessed by Host Computer 138 through one of the protocol endpoints that is hosted by Storage Appliance 2 104, e.g. through PE 2 312. A new binding created between VVol 1 208 and PE 2 312 is shown for purposes of illustration in FIG. 3 by New Binding 310, and may also or alternatively be stored in Host Computer 138 and/or Data Storage Management Interface Logic 134.

In response to creation of New Binding 310, Host Computer 138 sends host I/O operations directed to VVol 1 208 to PE 2 312 over New Data Path 304, and VVol 1 208 is subsequently provided to Host Computer 138 from Storage Appliance 2 104. For example, in response to receipt of the Bind Response 302, Host Computer 138 may create or store a copy of New Binding 310 and subsequently send host I/O operations that are directed to VVol 1 208 over New Data Path 304 between Host Computer 138 and PE 2 312. In this way Host Computer 138 may be provided with access to VVol 1 208 over New Data Path 304 in response to creation of the New Binding 310.

Migrating VVol 1 208 from Storage Appliance 1 102 to Storage Appliance 2 104 may include copying, from Storage Appliance 1 102 to Storage Appliance 2 104 over a communication path between Storage Appliance 1 102 and Storage Appliance 2 104 that is separate and independent from any of the data paths between Host Servers 136 and any of the protocol endpoints in the storage appliances in Storage Appliance Cluster 100, host data written to VVol 1 208 prior to VVol 1 208 being migrated to Storage Appliance 2 104. For example, such host data that that is copied as part of the migration process may include host data written to VVol 1 208 by write I/O operations directed to VVol 1 208 and conveyed from Host Computer 138 to PE 1 212 over Initial Data Path 214. Host data written to VVol 1 208 prior to VVol 1 208 being migrated to Storage Appliance 2 104 may include host data stored in units of non-volatile data storage allocated to VVol 1 208 from Storage Device(s) 110. FIGS. 4-7 illustrate examples of techniques for copying, from Storage Appliance 1 102 to Storage Appliance 2 104, host data written to VVol 1 208 prior to VVol 1 208 being migrated to Storage Appliance 2 104.

Figure 4:
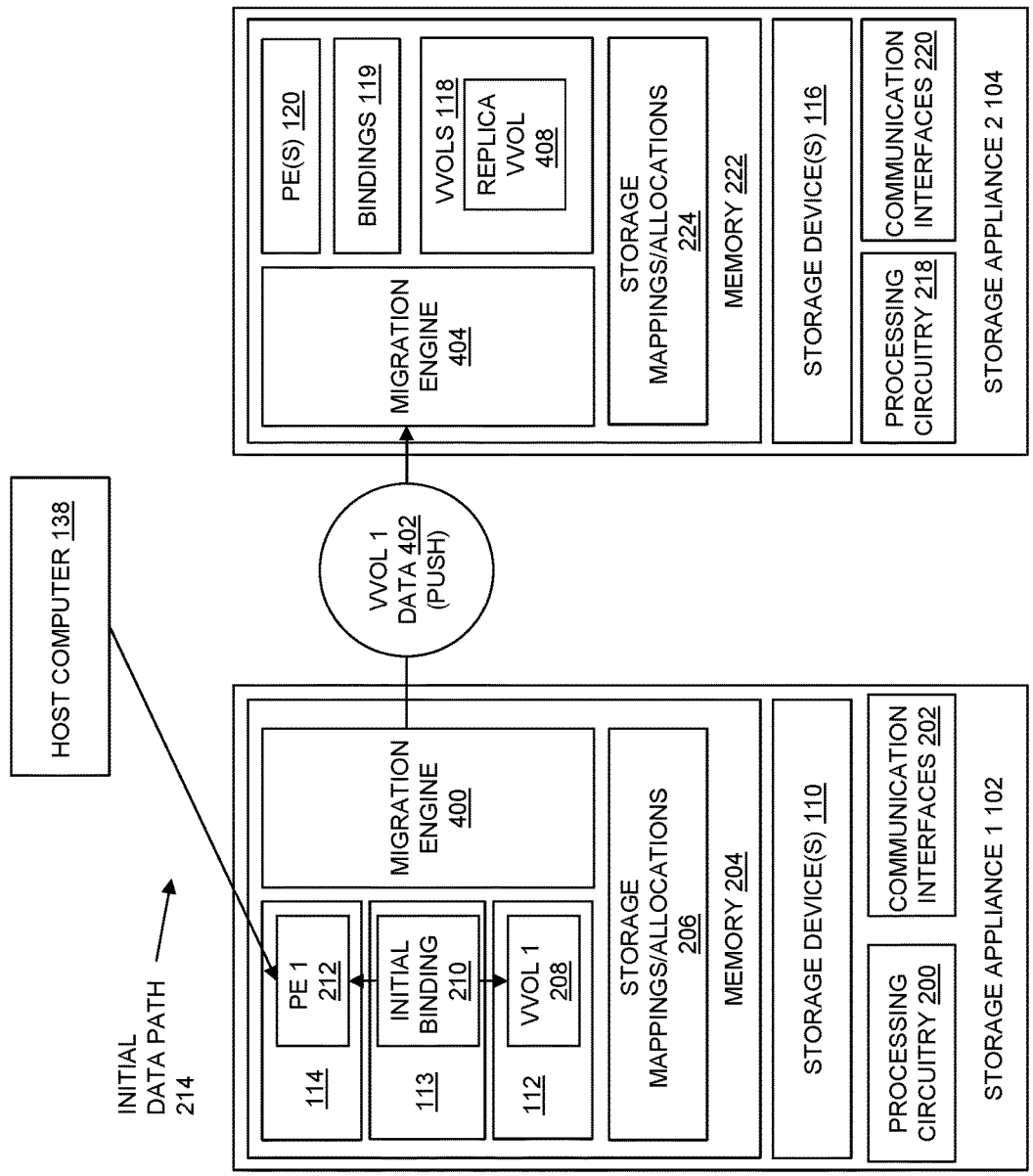
FIG. 4 is a block diagram showing an example of how virtual volume data may be pushed between storage appliances during migration of the virtual volume in some embodiments.

In FIG. 4, the host data stored in units of non-volatile data storage allocated to VVol 1 208 from Storage Device(s) 110 that is copied from Storage Appliance 1 102 to Storage Appliance 2 104 is shown by VVol 1 Data 402. As shown in FIG. 4, a Migration Engine 400 in Storage Appliance 1 102 may completely copy VVol 1 Data 402 to units of non-volatile data storage allocated from Storage Devices 116 by pushing VVol 1 Data 402 to a Migration Engine 404 in Storage Appliance 2 104 prior to VVol 1 208 being provided to Host Computer 138 from Storage Appliance 2 104, while access to VVol 1 208 is still being provided to Host Computer 138 over Initial Data Path 214. As VVol 1 Data 402 is received by Migration Engine 404, Migration Engine 404 may store VVol 1 Data 402 into a replica virtual volume used to store the copied data, shown by Replica VVol 408. Units of non-volatile storage from Storage Device(s) 116 may be allocated to Replica VVol 408 as needed to store VVol 1 Data 402 as it is received from Migration Engine 400 and stored in Replica VVol 408 by Migration Engine 404.

In some embodiments, after VVol 1 Data 402 has been pushed to Migration Engine 404, Replica Volume 408 may become VVol 1 208 on Storage Appliance 2 104, so that VVol 1 208 can be bound to a protocol endpoint in PE(s) 120 (e.g. PE 2 312), allowing the creation of the New Binding 310 between VVol 1 208 and PE 2 312. The New Binding 310 between VVol 1 208 and PE 2 312 can then be communicated to Host Computer 138 through Data Storage Management Interface Logic 134 and stored by Host Computer 138, e.g. by indicating in the Bind Response 302 that VVol 1 208 is now to be accessed through PE 2 312.

In some embodiments in which VVol 1 Data 402 is completely copied to units of non-volatile data storage allocated to Replica VVol 408 from Storage Devices 116 prior to VVol 1 208 being provided to Host Computer 138 from Storage Appliance 2 104, VVol 1 Data 402 may be completely copied to units of non-volatile data storage allocated to Replica VVol 408 from Storage Devices 116 prior to conveying Rebind Request Event 216 to Host Computer 138 (e.g. prior to placing Rebind Request Event 216 onto the Event Queue 230).

In some embodiments, VVol 1 Data 402 conveyed to Migration Engine 404 may include one or more snapshots of VVol 1 208 that are point in time copies of the contents of VVol 1 208.

In some embodiments, VVol 1 Data 402 conveyed to Migration Engine 404 may further include a "delta" of host data written to VVol 1 208 and collected in Storage Appliance 1 102 after a point in time at which the last snapshot of VVol 1 208 that was sent to Migration Engine 404 was captured.

In some embodiments, after the "delta" of host data captured in Storage Appliance 1 102 is collected and/or sent to Migration Engine 404 as part of VVol 1 Data 402, host write I/O operations directed to VVol 1 208 that are received over Initial Data Path 214 may be mirrored to the Replica VVol 408. Such mirroring of host write I/O operations directed to VVol 1 208 received over Initial Data Path 216 may continue even after Bind Response 302 is issued, e.g. until a path probe message (e.g. a SCSI Read Block 0 command) is received by Storage Appliance 2 104 from Host Computer 138 over New Data Path 304 through PE 2 312 indicating that Host Computer 138 has started accessing VVol 1 208 through PE 2 312 over New Data Path 304.

Figure 5:
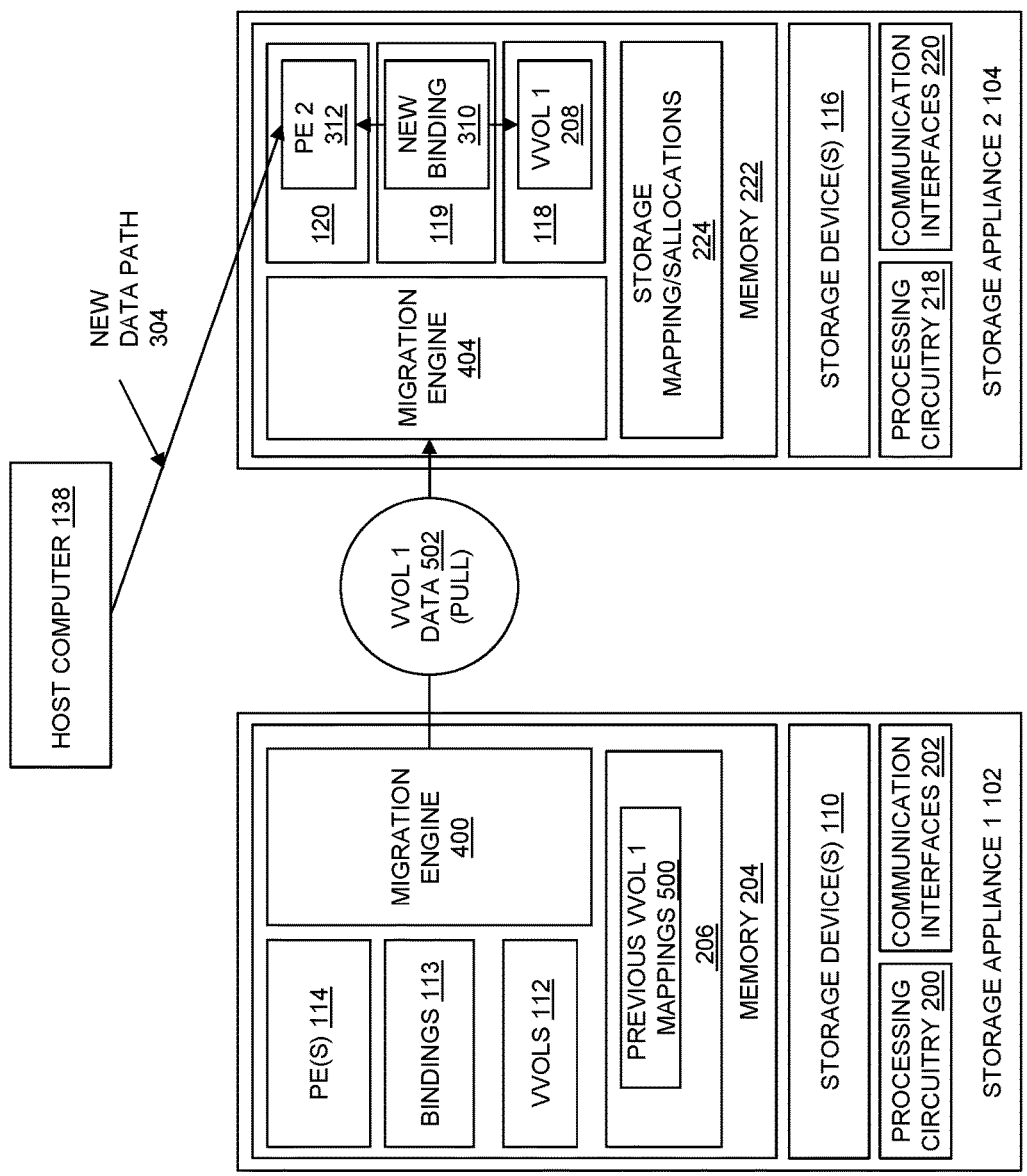
FIG. 5 is a block diagram showing an example of how virtual volume data may be pulled between storage appliances during migration of the virtual volume in some embodiments.

In FIG. 5, the host data stored in units of non-volatile data storage allocated to VVol 1 208 from Storage Device(s) 110 is shown by VVol 1 Data 502. As shown in FIG. 5, the Migration Engine 404 in Storage Appliance 2 104 may copy VVol 1 Data 502 to units of non-volatile data storage allocated from Storage Devices 116 at least in part by pulling VVol 1 Data 502 from Storage Appliance 1 102 to Storage Appliance 2 104 after Storage Appliance 2 104 has begun providing VVol 1 208 to Host Computer 138, while access to VVol 1 208 is provided to Host Computer 138 over New Data Path 304. Accordingly, in some embodiments, VVol 1 Data 502 may be copied to units of non-volatile data storage allocated from Storage Devices 116 at least in part by pulling VVol 1 Data 502 from Storage Appliance 1 102 to Storage Appliance 2 104 after the Rebind Request Event 216 has been conveyed to Host Computer 138.

For example, when a host read I/O operation directed to VVol 1 208 is received over New Data Path 304, and accesses host data stored in VVol 1 208 that has not previously been pulled from Storage Appliance 1 102, Migration Engine 404 may request that Migration Engine 400 retrieve that host data from units of Storage Device(s) 110 previously allocated to VVol 1 208 from Storage Device(s) 110 on Storage Appliance 1 102, e.g. based on Previous VVol 1 Mappings 500 maintained for purposes of the migration operation in the Storage Mappings/Allocations 206. The retrieved host data is then passed by Migration Engine 400 in VVol 1 Data 502 to Migration Engine 404. As VVol 1 Data 502 is received by Migration Engine 404, Migration Engine 404 stores VVol 1 Data 502 into units of non-volatile storage allocated to VVol 1 208 from Storage Device(s) 116 on Storage Appliance 2 104.

Figure 6:
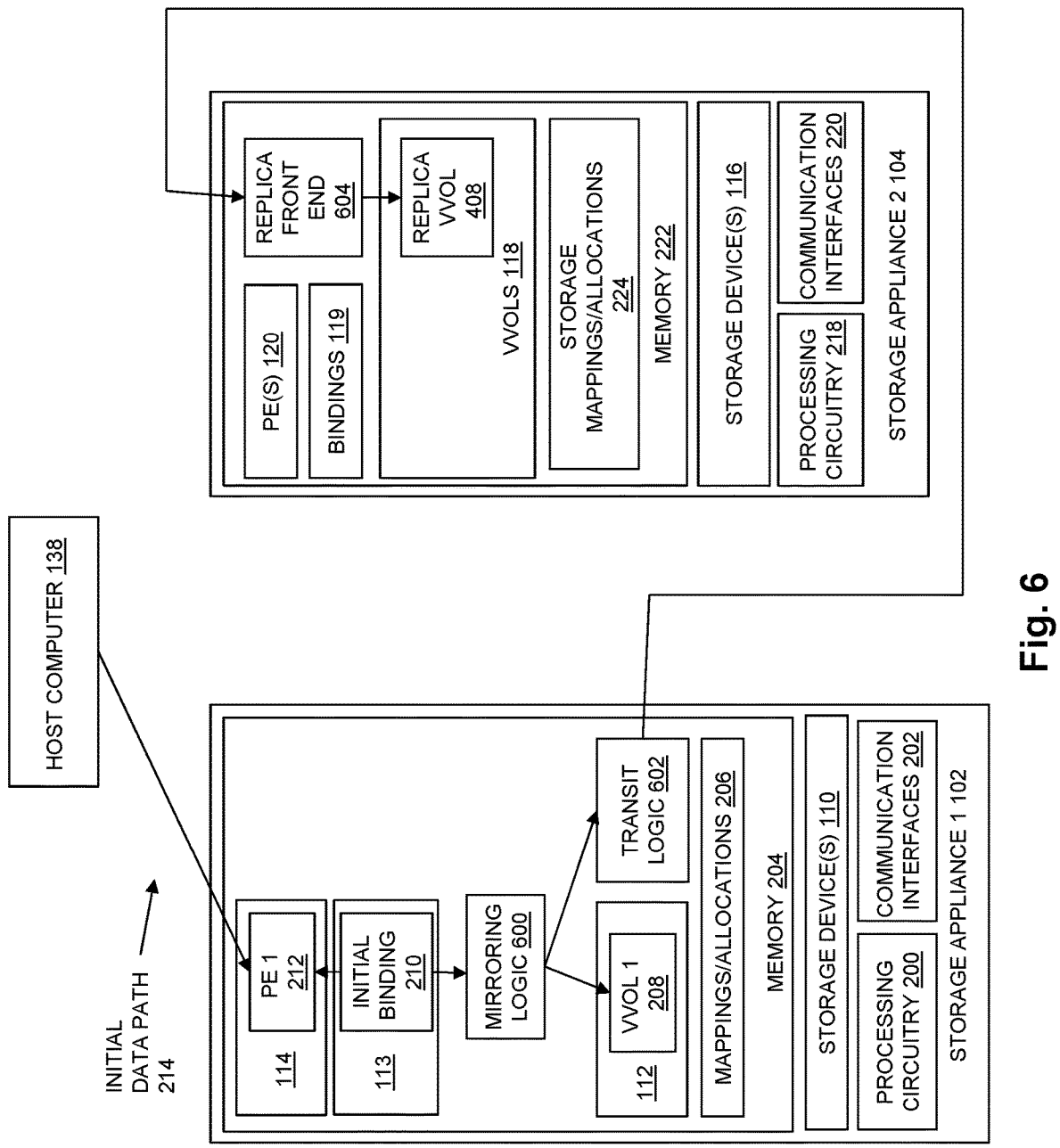
FIG. 6 is a block diagram showing another example of how virtual volume data may be pushed during migration of the virtual volume in some embodiments.
Figure 7:
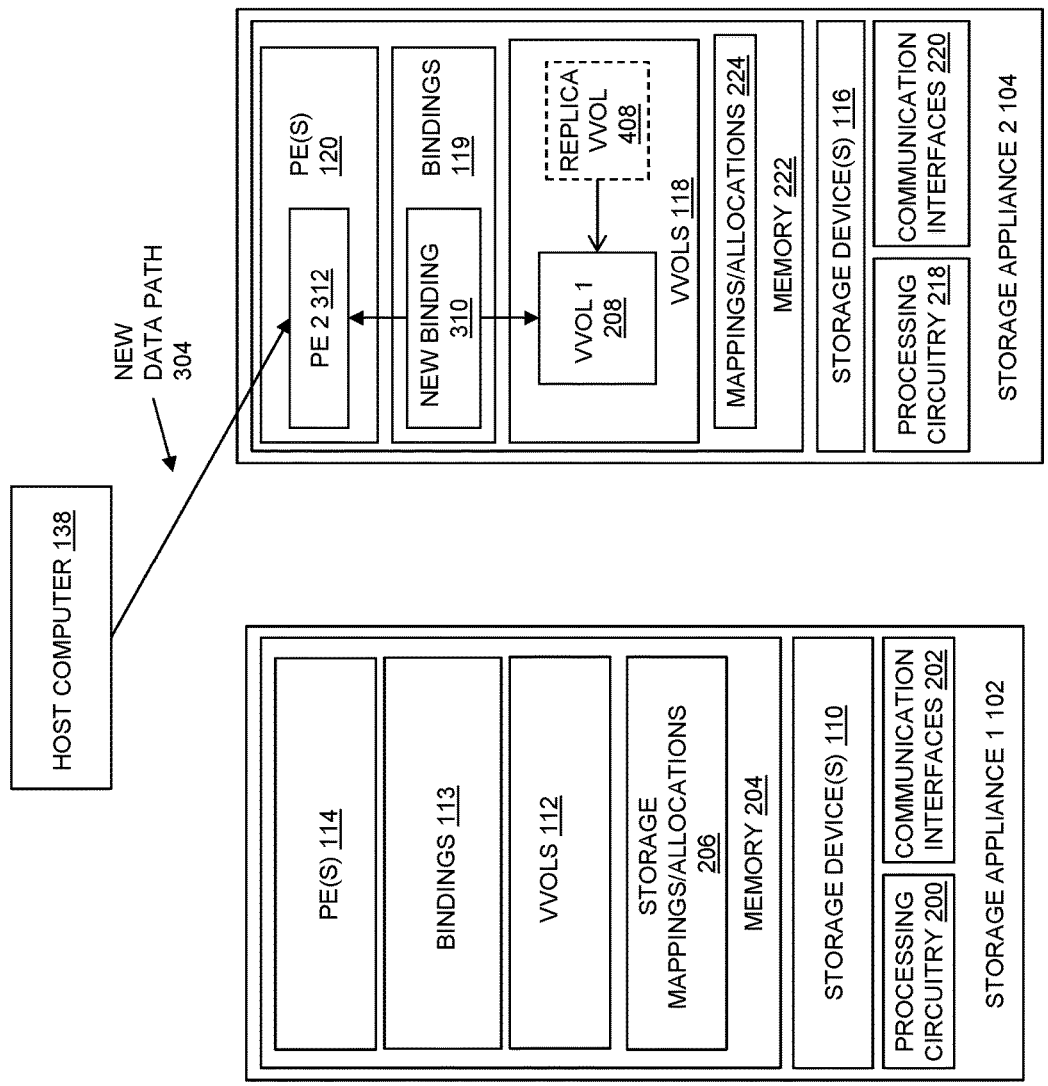
FIG. 7 is a block diagram further illustrating the example of FIG. 6 showing how virtual volume data may be pushed during migration of the virtual volume in some embodiments.

FIGS. 6 and 7 further illustrate examples of how virtual volume data may be pushed from Storage Appliance 1 102 to Storage Appliance 2 104. As shown in FIG. 6, during the migration of VVol 1 208 from Storage Appliance 1 102 to Storage Appliance 2 104, after zero or more snapshots of VVol 1 208 have been pushed to Storage Appliance 2 104, and after a "delta" of host data written to VVol 1 208 and collected in Storage Appliance 1 102 after the snapshots were captured has also been pushed to Storage Appliance 2 104, Mirroring Logic 600 in Storage Appliance 1 102 may mirror host write I/O operations directed to VVol 1 208 that are received by PE 1 212, such that the host write I/O operations directed to VVol 1 208 are both i) applied to VVol 1208, and also ii) passed to Transit Logic 602. Transit Logic 602 then conveys the mirrored host write I/O operations to a Replica Front End 604 in Storage Appliance 2 104. Replica Front End 604 is operable to receive data communications from Transit Logic 602 in Storage Appliance 1 102, and is logically and/or physically separate from the protocol endpoints in PE(s) 120 that are bound to virtual volumes being served to the Host Servers 136. In this way, Transit Logic 602 and Replica Front End 604 enable Storage Appliance 1 102 to communicate with Storage Appliance 2 104 independently with regard to any data paths between Host Servers 136 and Storage Appliance 1 102 and/or Storage Appliance 2 104. Replica Front End 604 applies the mirrored host write I/O operations it receives from Transit Logic 602 to Replica VVol 408. Replica Front End 604 may also operate to receive and write to Replica VVol 408 any snapshots of VVol 1 208, as well as any "delta" host data collected in Storage Appliance 1 102 after those snapshots were captured. After Mirroring Logic 600 has begun mirroring host write I/O operations directed to VVol 1 208 that are received by PE 1 212, the Rebind Request Event 216 is sent to Host Computer 138, causing Host Computer 138 to send the Bind Request 300, resulting in the Bind Response 302 being sent that requests Host Computer 138 to update its binding for VVol 1 208 to indicate that VVol 1 208 is now bound to PE 2 312 per New Binding 310.

As shown in FIG. 7, in response to receipt of a path probe message (e.g. a SCSI Read Block 0 command) from Host Computer 138, Storage Appliance 2 104 may make Replica VVol 408 accessible to Host Computer 138 as VVol 1 208, over New Data Path 304, based on the new binding of VVol 1 208 to PE 2 312. Storage Appliance 1 102 also ceases providing access to VVol 1 208 through PE 1 212 in response to receipt of the path prove message from Host Computer 138 by Storage Appliance 2 104. In the case where multiple host computers had previously accessed VVol 1 208 on Storage Appliance 1 102 in response to the binding between VVol 1 208 and PE 1 212, path probes must be received from all such host computers before i) Storage Appliance 2 104 allows VVol 1 208 to be accessed through PE 2 312, and ii) Storage Appliance 1 104 ceases providing access to VVol 1 208 through PE 1 212.

Figure 8:
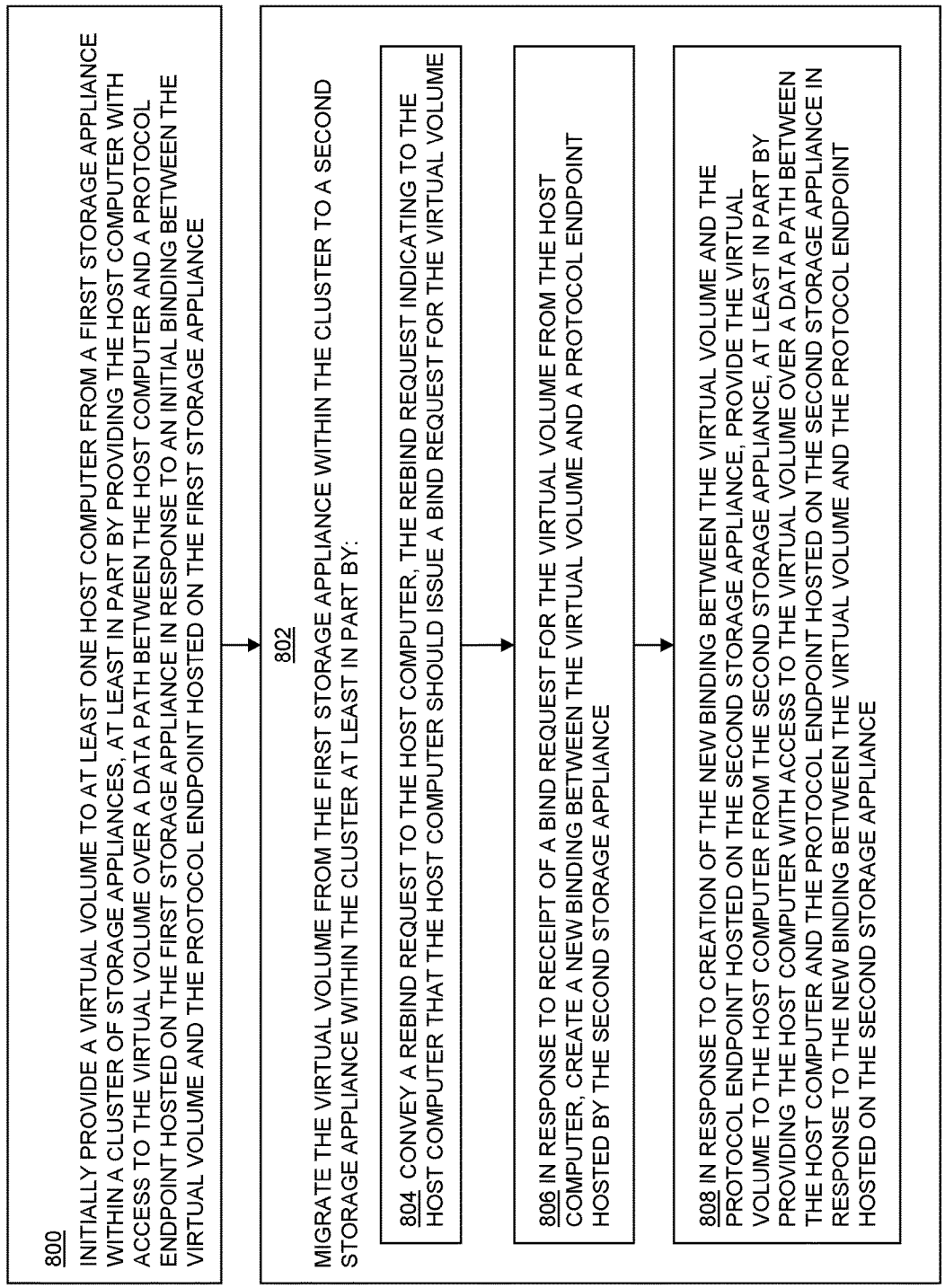
FIG. 8 is a flow chart showing an example of steps performed in some embodiments.

FIG. 8 is a flow chart showing an example of steps performed in some embodiments. At step 800, a virtual volume is initially provided to at least one host computer from a first storage appliance within a cluster of storage appliances, at least in part by providing the host computer with access to the virtual volume over a data path between the host computer and a protocol endpoint hosted on the first storage appliance in response to an initial binding between the virtual volume and the protocol endpoint hosted on the first storage appliance.

At step 802, the virtual volume is migrated from the first storage appliance within the cluster to a second storage appliance within the cluster. The migration of the virtual volume at step 802 includes step 804, in which a rebind request is conveyed to the host computer, the rebind request indicating to the host computer that the host computer should issue a new bind request for the virtual volume. The migration of the virtual volume at step 802 also includes step 806, in which in a new binding is created between the virtual volume and a protocol endpoint hosted by the second storage appliance in response to receipt of a bind request for the virtual volume from the host computer. The migration of the virtual volume at step 802 further may further include a step 808, in which in response to creation of the new binding between the virtual volume and the protocol endpoint hosted on the second storage appliance, the virtual volume is provided to the host computer from the second storage appliance, at least in part by providing the host computer with access to the virtual volume over a data path between the host computer and the protocol endpoint hosted on the second storage appliance in response to the new binding between the virtual volume and the protocol endpoint hosted on the second storage appliance.

While the above description provides examples of embodiments using various specific terms to indicate specific systems, devices, and/or components, such terms are illustrative only, and are used only for purposes of convenience and concise explanation. The disclosed system is not limited to embodiments including or involving systems, devices and/or components identified by the terms used above. For example, those skilled in the art will recognize that the terminology "first storage appliance" and "second storage appliance" in FIG. 8 and elsewhere is used only to distinguish between and refer to two different storage appliances. The use of the terminology "first storage appliance" and "second storage appliance" does not indicate any kind of ordering among or between storage appliances, or any specific directionality of migration of a virtual volume between storage appliances. The "first storage appliance" and "second storage appliance" may be any two storage appliances in the cluster, and the virtual volume migration disclosed herein may be performed between any two storage appliances in the cluster.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method of migrating a virtual volume, comprising:
   initially providing at least one host computer with access to the virtual volume through a protocol endpoint hosted on a first storage appliance in response to an initial binding between the virtual volume and the protocol endpoint hosted on the first storage appliance; and
   migrating the virtual volume from the first storage appliance to a second storage appliance at least in part by:
      conveying a rebind request to the host computer from a cluster that includes both the first storage appliance and the second storage appliance, wherein the rebind request indicates that the host computer should issue a bind request for the virtual volume to the cluster,
      creating a new binding between the virtual volume and a protocol endpoint hosted on the second storage appliance in response to receipt of a bind request for the virtual volume from the host computer, and
      making the virtual volume accessible to the host computer from the second storage appliance based on the new binding in response to receipt of a path probe message from the host computer by the second storage appliance.

2. The method of claim 1, wherein migrating the virtual volume from the first storage appliance to the second storage application further comprises ceasing providing the host computer with access to the virtual volume through the protocol endpoint hosted on the first storage appliance in response to receipt of the path probe message from the host computer by the second storage appliance.

3. The method of claim 1, wherein the at least one host computer comprises a plurality of host computers, and wherein migrating the virtual volume from the first storage appliance to the second storage appliance further comprises making the virtual volume accessible to the host computer from the second storage appliance based on the new binding in response to receipt of a path probe message from each one of the plurality of host computers by the second storage appliance.

4. The method of claim 1, wherein the at least one host computer comprises a plurality of host computers, and wherein migrating the virtual volume from the first storage appliance to the second storage application further comprises ceasing providing the plurality of host computers with access to the virtual volume through the protocol endpoint hosted on the first storage appliance in response to receipt of a path probe message from each one of the plurality of host computers by the second storage appliance.

5. The method of claim 1, further comprising mirroring, to the second storage appliance, prior to providing the virtual volume to the host computer from the second storage appliance, host I/O operations directed to the virtual volume and received by the first storage appliance over the data path between the host computer and the protocol endpoint hosted on the first storage appliance.

6. The method of claim 5, further comprising ceasing mirroring host I/O operations directed to the virtual volume and received by the first storage appliance over the data path between the host computer and the protocol endpoint hosted on the first storage appliance to the second storage appliance in response to receipt of the path probe from the host computer through the data path between the host computer and the protocol endpoint hosted on the second storage appliance.

7. The method of claim 5, wherein the at least one host computer comprises a plurality of host computers, and further comprising ceasing mirroring host I/O operations directed to the virtual volume and received by the first storage appliance over the data path between the host computer and the protocol endpoint hosted on the first storage appliance to the second storage appliance in response to receipt of a path probe message from each one of the plurality of host computers by the second storage appliance.

8. The method of claim 1, wherein the first storage appliance includes a first set of non-volatile data storage devices and the second storage appliance includes a second set of non-volatile data storage devices;
  wherein initially providing the virtual volume to the host from the first storage appliance further includes allocating portions of the non-volatile data storage devices in the first storage appliance to the virtual volume to store host data written to the virtual volume while the virtual volume is provided to the host computer from the first storage appliance; and further comprising:
  wherein migrating the virtual volume from the first storage appliance to the second storage appliance further includes copying, over a communication path between the first storage appliance and the second storage appliance that is different from the data path between the host computer and the protocol endpoint hosted on the first storage appliance and the data path between the host computer and the protocol endpoint hosted on the second storage appliance, the host data stored in the portions of the non-volatile data storage devices in the first storage appliance allocated to the virtual volume to portions of the non-volatile data storage devices in the second storage appliance.

9. The method of claim 8, wherein the host data stored in the portions of the non-volatile data storage devices in the first storage appliance allocated to the virtual volume is copied to portions of the non-volatile data storage devices in the second storage appliance at least in part while providing the virtual volume to the host computer from the second storage appliance.

10. A non-transitory computer readable medium for migrating a virtual volume between different storage appliances, the non-transitory medium having a set of instructions stored thereon, the set of instructions, when executed on processing circuitry, cause the processing circuitry to perform the steps of:
  initially providing at least one host computer with access to the virtual volume through a protocol endpoint hosted on a first storage appliance in response to an initial binding between the virtual volume and the protocol endpoint hosted on the first storage appliance; and
  migrating the virtual volume from the first storage appliance to a second storage appliance at least in part by:
    conveying a rebind request to the host computer from a cluster that includes both the first storage appliance and the second storage appliance, wherein the rebind request indicates that the host computer should issue a bind request for the virtual volume to the cluster,
    creating a new binding between the virtual volume and a protocol endpoint hosted on the second storage appliance in response to receipt of a bind request for the virtual volume from the host computer, and
    making the virtual volume accessible to the host computer from the second storage appliance based on the new binding in response to receipt of a path probe message from the host computer by the second storage appliance.

11. The non-transitory computer readable medium for migrating a virtual volume between different storage appliances of claim of claim 10, wherein the set of instructions, when executed on processing circuitry, further causes the processing circuitry to perform the step of migrating the virtual volume from the first storage appliance within the cluster to the second storage appliance within the cluster at least in part by ceasing providing the host computer with access to the virtual volume through the protocol endpoint hosted on the first storage appliance in response to receipt of the path probe message from the host computer by the second storage appliance.

12. The non-transitory computer readable medium for migrating a virtual volume between different storage appliances of claim of claim 10, wherein the at least one host computer comprises a plurality of host computers, and wherein the set of instructions, when executed on processing circuitry, further causes the processing circuitry to perform the step of migrating the virtual volume from the first storage appliance within the cluster to the second storage appliance within the cluster at least in part by making the virtual volume accessible to the host computer from the second storage appliance based on the new binding in response to receipt of a path probe message from each one of the plurality of host computers by the second storage appliance.

13. The non-transitory computer readable medium for migrating a virtual volume between different storage appliances of claim of claim 10, wherein the at least one host computer comprises a plurality of host computers, and wherein the set of instructions, when executed on processing circuitry, further causes the processing circuitry to perform the step of migrating the virtual volume from the first storage appliance within the cluster to the second storage appliance within the cluster at least in part by ceasing providing the plurality of host computers with access to the virtual volume through the protocol endpoint hosted on the first storage appliance in response to receipt of a path probe message from each one of the plurality of host computers by the second storage appliance.

14. The non-transitory computer readable medium for migrating a virtual volume between different storage appliances of claim of claim 10, wherein the set of instructions, when executed on processing circuitry, further cause the processing circuitry to perform the step of:
  mirroring, to the second storage appliance, prior to providing the virtual volume to the host computer from the second storage appliance, host I/O operations directed to the virtual volume and received by the first storage appliance over the data path between the host computer and the protocol endpoint hosted on the first storage appliance.

15. The non-transitory computer readable medium for migrating a virtual volume between different storage appliances of claim of claim 14, wherein the set of instructions, when executed on processing circuitry, further cause the processing circuitry to perform the step of:

ceasing mirroring host I/O operations directed to the virtual volume and received by the first storage appliance over the data path between the host computer and the protocol endpoint hosted on the first storage appliance to the second storage appliance in response to receipt of the path probe from the host computer through the data path between the host computer and the protocol endpoint hosted on the second storage appliance.

16. The non-transitory computer readable medium for migrating a virtual volume between different storage appliances of claim of claim 14, wherein the at least one host computer comprises a plurality of host computers, and wherein the set of instructions, when executed on processing circuitry, further cause the processing circuitry to perform the step of:

ceasing mirroring host I/O operations directed to the virtual volume and received by the first storage appliance over the data path between the host computer and the protocol endpoint hosted on the first storage appliance to the second storage appliance in response to receipt of a path probe message from each one of the plurality of host computers by the second storage appliance.

17. A system for migrating a virtual volume between different storage appliances, the system comprising:

processing circuitry;

memory having program code stored thereon that is executable on the processing circuitry, wherein the program code, when executed on the processing circuitry, causes the processing circuitry to:

initially provide at least one host computer with access to the virtual volume through a protocol endpoint hosted on a first storage appliance in response to an initial binding between the virtual volume and the protocol endpoint hosted on the first storage appliance; and migrate the virtual volume from the first storage appliance to a second storage appliance at least in part by causing the processing circuitry to:

convey a rebind request to the host computer from a cluster that includes both the first storage appliance and the second storage appliance, wherein the rebind request indicates that the host computer should issue a bind request for the virtual volume to the cluster, create a new binding between the virtual volume and a protocol endpoint hosted on the second storage appliance in response to receipt of a bind request for the virtual volume from the host computer, and make the virtual volume accessible to the host computer from the second storage appliance based on the new binding in response to receipt of a path probe message from the host computer by the second storage appliance.

18. The system for migrating a virtual volume between different storage appliances method of claim 17, wherein the program code, when executed further causes the processing circuitry to migrate the virtual volume from the first storage appliance to a second storage appliance at least in part by causing the processing circuitry to cease providing the host computer with access to the virtual volume through the protocol endpoint hosted on the first storage appliance in response to receipt of the path probe message from the host computer by the second storage appliance.

19. The system for migrating a virtual volume between different storage appliances method of claim 17, wherein the at least one host computer comprises a plurality of host computers, and wherein the program code, when executed further causes the processing circuitry to migrate the virtual volume from the first storage appliance to a second storage appliance at least in part by causing the processing circuitry to make the virtual volume accessible to the host computer from the second storage appliance based on the new binding in response to receipt of a path probe message from each one of the plurality of host computers by the second storage appliance.

20. The system for migrating a virtual volume between different storage appliances method of claim 17, wherein the at least one host computer comprises a plurality of host computers, and wherein the program code, when executed further causes the processing circuitry to migrate the virtual volume from the first storage appliance to a second storage appliance at least in part by causing the processing circuitry to cease providing the plurality of host computers with access to the virtual volume through the protocol endpoint hosted on the first storage appliance in response to receipt of a path probe message from each one of the plurality of host computers by the second storage appliance.

* * * * *